US007027395B2

United States Patent
Elloumi et al.

(10) Patent No.: US 7,027,395 B2
(45) Date of Patent: Apr. 11, 2006

(54) METHOD FOR MARKING PACKETS OF A DATA TRANSMISSION FLOW AND MARKER DEVICE PERFORMING THIS METHOD

(75) Inventors: Omar Elloumi, Antwerpen (BE); Stefaan De Cnodder, Lille (BE)

(73) Assignee: ALCATEL, Paris (FR)

( * ) Notice: Subject to any disclaimer, the term of this patent is extended or adjusted under 35 U.S.C. 154(b) by 918 days.

(21) Appl. No.: 09/925,738

(22) Filed: Aug. 10, 2001

(65) Prior Publication Data
US 2002/0031089 A1    Mar. 14, 2002

(30) Foreign Application Priority Data
Aug. 18, 2000 (BE) .................................. 00402306

(51) Int. Cl.
*H04L 12/56* (2006.01)
(52) U.S. Cl. .................. 370/231; 370/252; 370/395.21
(58) Field of Classification Search ................ 370/229, 370/230, 230.1, 231, 235, 236, 237, 249, 370/252, 253, 389, 395.1, 395.2, 395.21, 370/395.4, 395.42, 395.43; 709/230, 232, 709/234, 235, 238, 240
See application file for complete search history.

(56) References Cited

U.S. PATENT DOCUMENTS

| 5,367,523 | A | | 11/1994 | Chang et al. | |
|---|---|---|---|---|---|
| 5,892,754 | A | * | 4/1999 | Kompella et al. | 370/236 |
| 5,936,940 | A | * | 8/1999 | Marin et al. | 370/232 |
| 5,953,318 | A | * | 9/1999 | Nattkemper et al. | 370/236 |
| 5,978,356 | A | * | 11/1999 | Elwalid et al. | 370/230 |
| 6,032,272 | A | * | 2/2000 | Soirinsuo et al. | 714/706 |
| 6,104,700 | A | * | 8/2000 | Haddock et al. | 370/235 |
| 6,108,307 | A | * | 8/2000 | McConnell et al. | 370/235 |
| 6,160,818 | A | * | 12/2000 | Berger et al. | 370/468 |
| 6,625,118 | B1 | * | 9/2003 | Hadi Salim et al. | 370/229 |
| 6,724,766 | B1 | * | 4/2004 | Michiel | 370/412 |
| 6,781,991 | B1 | * | 8/2004 | Anderlind | 370/394 |

FOREIGN PATENT DOCUMENTS

WO    WO 00/02395    1/2000

OTHER PUBLICATIONS

"A Single Rate Three Color Marker" J. Heinanen, IETF, Mar. 1999, pp. 1-5.

* cited by examiner

Primary Examiner—Alpus H. Hsu
(74) Attorney, Agent, or Firm—Sughrue Mion, PLLC

(57) ABSTRACT

A method for marking data packets of a data transmission flow pertaining to an end-to-end connection within a packet network is disclosed. The priority value is calculated based on at least one service quality parameter attributed to the data transmission flow, and upon a network feedback parameter indicative of the state of congestion within the packet network. A marker device adapted for performing the method is described as well.

20 Claims, 2 Drawing Sheets

METHOD FOR MARKING PACKETS OF A DATA TRANSMISSION FLOW AND MARKER DEVICE PERFORMING THIS METHOD

BACKGROUND OF THE INVENTION

The present invention relates to a method for marking packets of a data transmission flow pertaining to an end-to-end connection, and to a marker device for performing said method.

Marker devices and methods of operation are already known in the art, e.g. from "RFC 2697 of the IETF Network working group". Therein, a single rate three color marker is presented which marks packets of a traffic stream to be either green, yellow or red. These three color marking values can be considered as priorities. These priorities are based upon three traffic parameters which correspond to service quality parameters of the traffic stream under consideration.

In the Internet, which is an example of a packet network, such a method and marker device, in conjunction with a drop mechanism in the routers based on the priorities of the data packets, and in conjunction with the intrinsic properties of the TCP/IP protocol, allow for differentiation of several traffic flows based on their service quality and/or traffic parameters. These service quality parameters are generally agreed between the user and the Internet Service Provider, hereafter abbreviated with ISP, before the actual transmission of data takes place. The combination of all three mechanisms results in a differentiation of the reduction of the rate of the respective traffic flows in accordance to their respective priorities, in case of congestion within the Internet. Since these priorities are determined based on the service quality parameters, service level differentiation is thus obtained.

However, in case of serious congestion problems within the Internet, this mechanism can loose its efficiency. Indeed, it is nearly impossible for any service provider to foresee congestion within the Internet itself, such that the negotiated traffic or service quality parameters can still be an overestimation of what the network inside is really capable of. This results in all TCP connections of this service provider to be congested. The result of the mechanism will be that all TCP sources will end up with sending high priority packets, which, of course, does no longer correspond to service differentiation anymore.

SUMMARY OF THE INVENTION

An aspect of the present invention is therefore to provide a marker mechanism and a marker device of the above known type but which allow for service differentiation even in case of severe congestion problems within the Internet.

In this way, since the priorities are now directly dependent upon a network feedback parameter indicative of the status of the congestion in the network, a direct instead of an indirect influence of the congestion upon the priorities is obtained. This is of course much more efficient.

These network feedback parameters can concern both congestion on the end-to-end connections themselves, for instance by means of the well-known TCP acknowledgements, or congestion within internal core routers within the network, for instance based on dedicated or specific congestion information packets to be generated by these core routers themselves.

By thereby further considering other parameters attributed to the end-to-end connections itself, which are thus different from the already mentioned and used service quality parameters as well as from the network feedback parameter indicating congestion, a better level of differentiation with respect to the end-to-end connections itself, is obtained. These other parameters can be negotiated during the service level agreement phase between the user intending to transmit data pertaining to individual TCP flows and the ISP.

A first type of these other parameters attributed to the end-to-end connection comprises of a reduction factor, which is used for influencing the rate with which a first type of these priorities, for instance the highest priority, is generated. By reducing the rate of generating the highest priority, and in accordance with this reduction parameter attributed to the end-to-end connection, a much faster and differentiated reduction of the flow is obtained. Similarly, a second type of these other parameters attributed to the end-to-end connection comprises an increase parameter. This one is used for again increasing the rate, during periods of non-congestion, with which this first type of these priorities, for instance the highest priority, is generated. Again, a differentiation with respect to other end-to-end connections is obtained.

Since in general end-to-end connections in the Internet are associated to different terminals, the thus obtained marking mechanism also allows for a differentiation with respect to the terminals, taking into account congestion information.

The use of an agreed bandwidth value and an agreed burst tolerance value as service quality parameters, allow for compatibility with existing marker mechanisms such as the token bucket mechanism.

The invention relates as well to a terminal and to an edge router that incorporates such a marker device.

BRIEF DESCRIPTION OF THE DRAWINGS

The above and other aspects and features of the invention will become more apparent and the invention itself will be best understood by referring to the following description of an embodiment taken in conjunction with the accompanying drawings wherein the figures represent embodiments a marker device MD according to the present invention. In the figures.

DETAILED DESCRIPTION OF THE INVENTION

Figure 1:
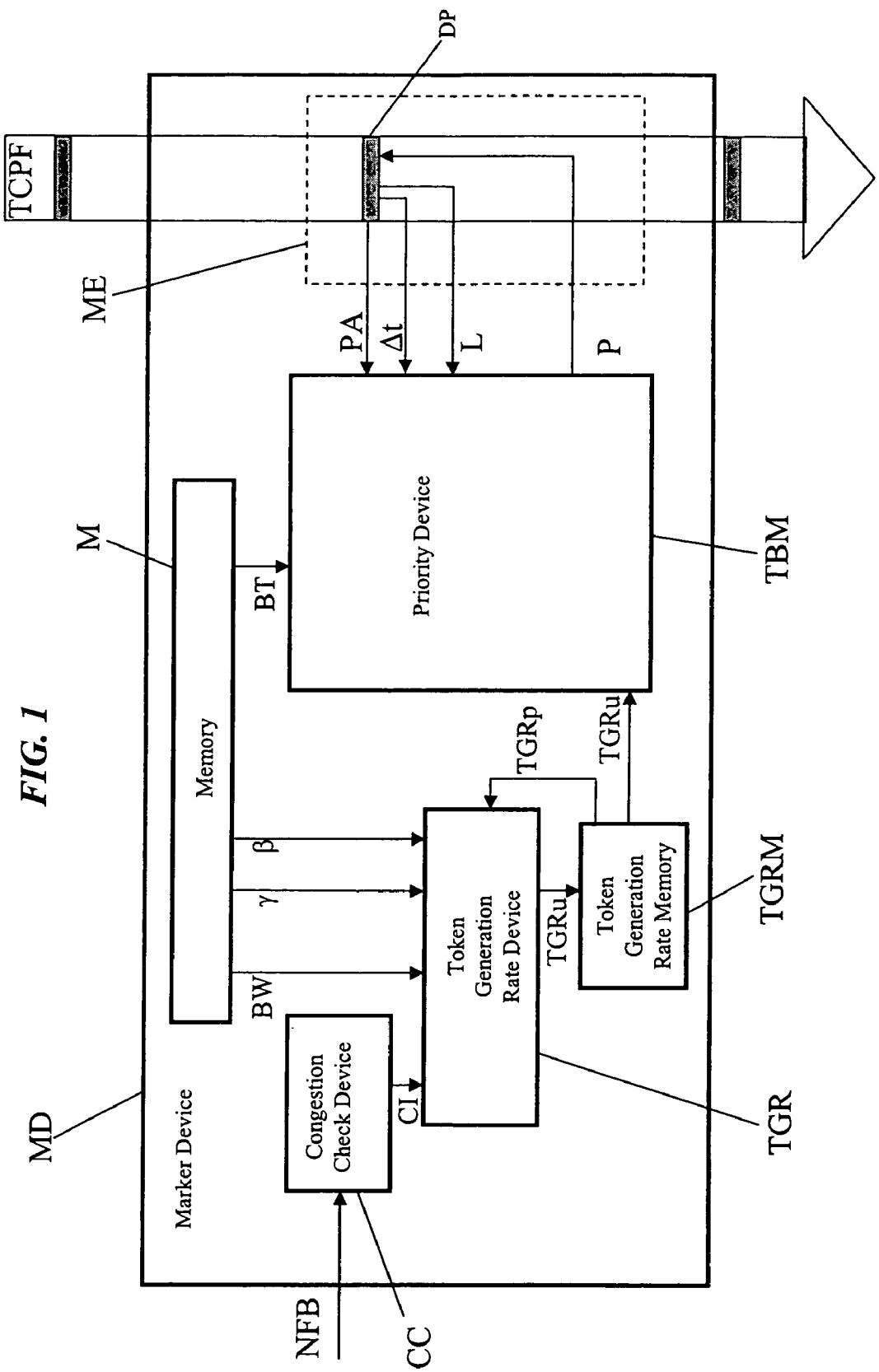
FIG. 1 illustrates an embodiment of a marker device MD according to an aspect of the present invention.
Figure 2:
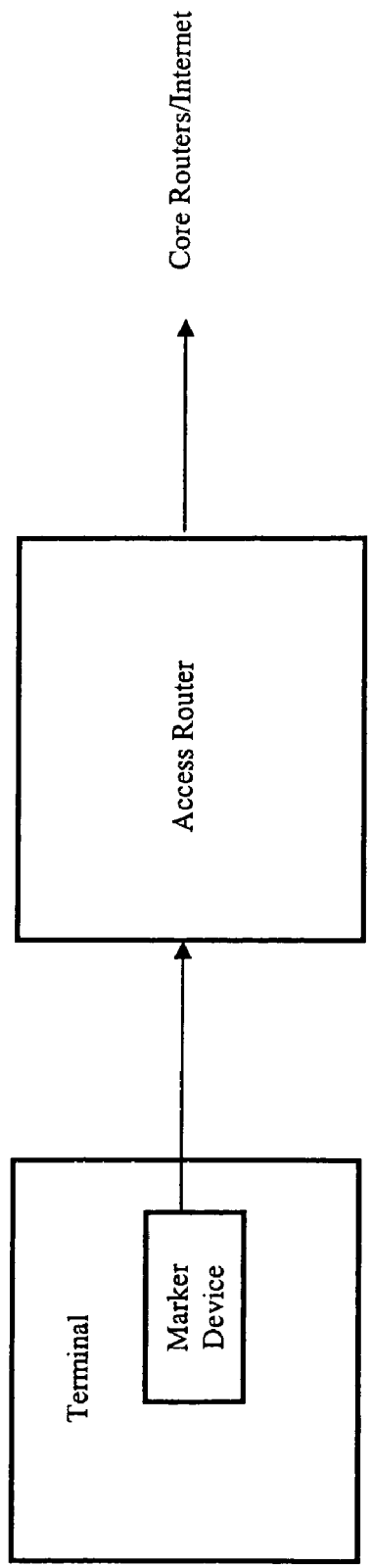
FIG. 2 illustrates an embodiment of a marker device MD in a packet network according to an aspect of the present invention.
Figure 3:
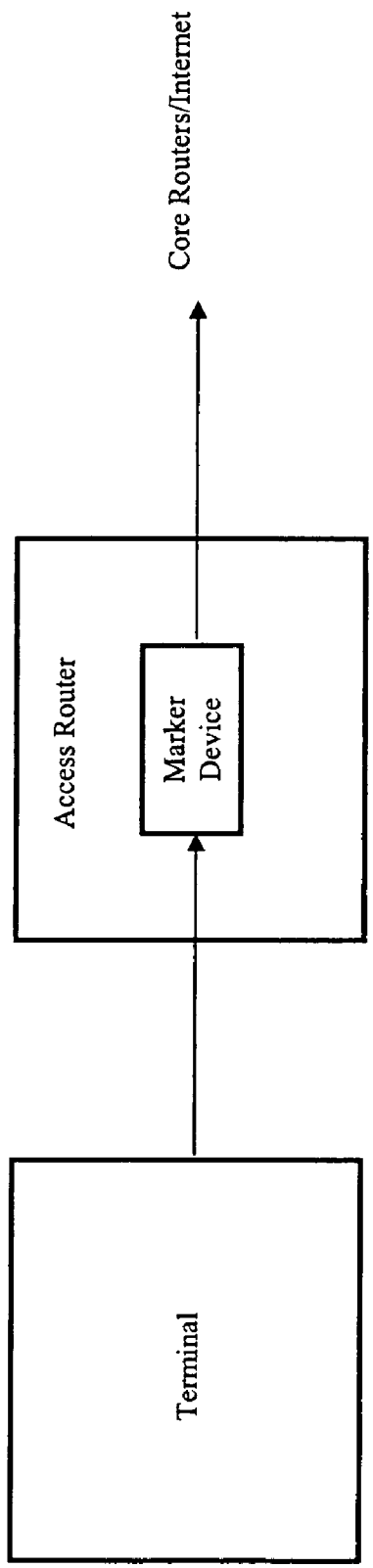
FIG. 3 represents an embodiment of a marker device MD in a packet network according to an aspect of the present invention.

The marker device MD of the present invention is used in packet networks such as the Internet, aiming for differentiated services. With differentiated services is meant that several service or quality of service classes are supported, whereby within the IP-header of each data packet a specific field, named the Type of Service and abbreviated with ToS field, can be set to a specific value. This allows different types of data packets or data packets belonging to a specific connection, to be distinguished from each other so that they can be forwarded differently. For the standardized DiffServ model, this ToS field is renamed as DiffServ Code-Point and abbreviated with DSCP, to indicate the quality of service requirement of the data packet. Each data packet contains its own service parameter, which partly determines the way it should be treated at each hop or router. The way different data packets with different service parameters are treated at such a router or hop, is further determined by another set of bits within this DSCP field, this set representing the value of a priority. The attribution and insertion of the priorities in the data packets is done within a marker device that is situated either in the data packets transmitting terminal itself, or within the routers of the data packet network. Among these routers one can distinguish access or edge routers and core routers, based on their position within the Internet. Access routers are thereby directly coupled to the user terminals and situated in between the user terminals and the core routers.

The present invention deals with the initial marking process of the data packets, which takes place either in the data transmitting terminal itself, or within the access router coupled to this data transmitting terminal. Marking devices placed in the core routers and which are adapted for adapting the value of the markers of the incoming packets, are not subject of this invention.

The values of these priorities, in conjunction with their quality of service classes, are used within the routers to determine the so-called per-hop behavior. These per-hop behaviors are generally implemented by means of buffer acceptance mechanisms, also known as active queue management mechanisms and schedulers, whereby packets pertaining to the several service classes, are dropped or queued on the basis of their priority and of this quality of service, and of other parameters related to the filling of the queue. One of these buffer acceptance mechanisms is for instance the so-called Random Early Detection, abbreviated with RED, algorithm. Extensive descriptions of this mechanism can be found in literature, for instance in the article "Random Early Detection gateways for Congestion Avoidance", by S. Floyd and V. Jacobson, IEEE/ACM transactions on Networking, V.1 N.4, August 1993, p 397–413. It will however also be briefly explained in the next paragraph, since this algorithm can for instance be used in conjunction with the marker device of the present invention, for obtaining service level differentiation.

RED is an active queue management scheme, which tries to keep the overall throughput high while maintaining a small average queue length. RED has four configurable parameters. There are two buffer thresholds, between which probabilistic packet drops occur. When the average queue occupancy is below the minimum threshold, no packets are dropped. When the average queue occupancy exceeds the minimum threshold, packets are dropped with an increasing probability. When the average queue size exceeds the maximum threshold all arriving packets are dropped. For service differentiation purposes, the parameters that directly control the average queue lengths are also used. The idea is to have n, with n having a minimum value of 2 and related to the amount of priorities used when marking the packets, sets of thresholds, a maximum drop probability and a weight. The differences in parameter values will then result into different drop probabilities given an average queue length.

The marking mechanism of the present invention is used in conjunction with a drop mechanism having at least two, but in general, as much as there are priorities, different drop probability curves for dropping packets with the different priorities in queues pertaining to the service classes.

The marker mechanism as well as the marker device of the present invention will now be discussed.

A marker device MD is shown in FIG. 1. It includes a memory denoted M for storing service quality parameter values such as an agreed bandwidth BW, an agreed burst tolerance value BT, and two parameters, denoted $\beta$ and $\gamma$, which are also attributed to the end-to-end connection under consideration. This end-to-end connection in the Internet consists of a TCP connection, the corresponding TCP flow being denoted TCPF and being represented by the thick arrow entering the marker device and leaving it as well. All four parameters BW, BT, $\beta$ and $\gamma$ were agreed between the user and the ISP, and can be considered as being static parameters for the operation of the marker device for a particular end-to-end connection. They may however be updated regularly, upon which process new values will be stored within M.

The TCP flow, of which several packets are indicated as dark rectangles, enters the marker device within a device, denoted ME. The latter device is adapted to, upon arrival of a new data packet denoted DP, to give a trigger PA to another device TBM, to extract the length L, in bytes, of this data packet, and to calculate $\Delta t$ being the time between the previous packet arrival and the current one. This value, as well as the length of the packet L is as well delivered to the device TBM, whose operation will be described in a next paragraph.

The marker device MD further receives information from the packet network under the form of a network feedback parameter NFB, which contains information related to the state of congestion within the network. This parameter can be related to the state of congestion on the end-to-end connection, and as such may for instance consist of the TCP-duplicate or normal acknowledgement signal. Another example of congestion information within the network can consist of the ECN-bit, in case the network is ECN capable. ECN thereby is the abbreviation of Explicit Congestion Notification, which mechanism is also described in the current literature, for instance in the article "A proposal to add Explicit Congestion Notification (ECN) to IP", by K. K. Ramakrishnan and S. Floyd, RFC 2481. However this network feedback parameter NFB can also contain information related to the status of congestion within a core router, generated and transmitted by this core router itself. In the latter case several of these signals, generated by several congested core routers can enter the marker device.

In the next paragraphs, an embodiment of the marker device will be described which is adapted to receive the normal and duplicate acknowledgements of the TCP connection for each transmitted packet. Upon receipt of one of these signals by the marker device, they are checked for congestion within a congestion check device CC. Dependent of the result of this check, the output signal CI of this congestion check device will be indicative of congestion or not. This signal is an input signal for a token generation rate device TGR which derives from it and from the value of the agreed bandwidth BW, of the parameters $\gamma$ and $\beta$ related to the TCP connection under consideration, and of a previous or starting value of a token generation rate, an updated value TGRu of this token generation rate. This updated value is temporarily stored in a token generation rate memory TGRM. Upon arrival of a new network feedback signal NFB, CI is updated and will trigger TGR to calculate a new value of TGRu. TGR is thus triggered or activated by the arrival of NFB signals.

In order to distinguish between the previous value TGRp and the updated value TGRu of the token generation rate variable used and generated within TGR, the old value TGRp, is denoted as a separate signal from TGRu.

The updated value TGRu is as well requested from TGRM and used by a priority device TBM, upon arrival of a new data packet DP from the TCP flow TCPF. As already explained in a previous paragraph of this document, this arrival is triggered by a signal PA. This priority device generates from TGRu, from L being the length of the packet, and from the already mentioned Δt, a priority P. This priority, or marker, is delivered back to the device ME, which inserts it in the data packet DP, which arrival was last detected. It is to be remarked that this priority generation occurs at minimum the speed of the data arrival transmission, thus buffering of packets is thereby reduced to a minimum.

In the following, a possible algorithm for calculating the token generation rate and the priority will be described.

The initial value of the token generation rate is set to BW.

Upon arrival of a network feedback signal, for instance a TCP acknowledgement or duplicate acknowledgement, a check is performed within CC to determine whether there is congestion or not. An updated value of the variable CI is thereby generated.

In case of non-congestion the updated value TGRu of the token generation rate is calculated as its previous value TGRp, multiplied by (β1), whereby β is a positive number, larger than zero. β is therefore also named an increase factor.

In case of congestion, the updated value TGRu of the token generation rate is calculated from the previous value TGRp, multiplied by γ, with γ larger than zero and smaller than one. γ is therefore also named a decrease factor.

Upon arrival of a data packet DP, the PA signal triggers the TBM. An internal variable, being the token count TC, will then be updated according to the following equation:

$$TC \leftarrow \min(TC + TGRu.\Delta t, BT)$$

whereby TGRu represents the value requested by TBM from the memory TGRM.

Next TC is compared with L. In case TC is lower than L, the priority P is set to be low. In case TC exceeds or is equal to L, the value of TC is reduced with L, and the priority is set to be high.

The initial value of the TC is set as BT.

The embodiment and algorithm described thus used two priority values, High or Low. In order to use this marker algorithm within a service differentiation method, the per-hop behavior in the routers need to be compliant to two priorities, and thus need to provide for two different drop behaviors, one for each priority. The already mentioned 2-RED method as well as the RIO which stands for the RED In and OUT algorithm and which is also described in the literature can thus be used for this.

It is however to be noted that marker methods and marker devices according to the invention exist with more than two priorities. For n priorities, the Per Hop behavior within the routers can than for instance consist of n-RED. It is also to be remarked that other algorithms and consequently other marker device embodiments exist whereby the priority generation is based purely on a network feedback congestion parameter, in conjunction with BW and BT.

While the principles of the invention have been described above in connection with specific apparatus, it is to be clearly understood that this description is made only by way of example and not as a limitation on the scope of the invention, as defined in the appended claims.

The invention claimed is:

1. A method for marking data packets of a data transmission flow pertaining to an end-to-end connection to which an end-to-end transport protocol is associated within a packet network, said method comprising:

for each subsequent one of said data packets, generating a priority based on at least one service quality parameter attributed to said data transmission flow and based upon a network feedback parameter indicative of the state of congestion with said packet network, and inserting said priority within said each subsequent one of said data packets for further transmission to said packet data network, wherein said network feedback parameter is extracted from a standard feedback packet of said end-to-end protocol.

2. The method according to claim 1, wherein said network feedback parameter is related to the state of congestion on said end-to-end connection or with a routing device of said network.

3. The method according to claim 1, wherein said method further comprises determining the rate at which said priority is generated.

4. The method according to claim 3, wherein said priority generation rate is generated from a reduction factor attributed to said end-to-end connection and from said at least one other service quality parameter.

5. The method according to claim 4, wherein said priority has one of a predetermined set of priority values.

6. The method according to claim 4, wherein the rate of generating a first type of priority having a first predetermined value of said set is decreased based on said reduction factor.

7. The method according to claim 1, wherein said at least one service quality parameter comprises of at least one of an agreed bandwidth value and an agreed burst tolerance value.

8. The method according to claim 1, wherein said priority generation rate is generated from an increase factor attributed to said end-to-end connection and from said at least one other service quality parameter.

9. The method according to claim 8, wherein the rate of generating said first type of priority is increased based on said increase factor.

10. A marker device that generates a priority and inserts said priority within a data packet of a data transmission flow pertaining to an end-to-end connection to which an end-to-end protocol is associated within a packet network, said marker device generating said priority based on at least one service quality parameter attributed to said data transmission flow and on a network feedback parameter indicative of the state of congestion within said packet network, said marker device comprising:

a congestion check device that receives packets comprising said network feedback parameter, wherein said congestion check device receives standard feedback packets of said end-to-end transport protocol and extracts said network feedback parameter therefrom;

a priority device coupled to said congestion check device, wherein said priority device generates said priority; and an inserting device coupled to said priority device, wherein said inserting device inserts said priority into said data packet.

11. The marker device according to claim 10 further comprising a token generation rate device, wherein, upon receipt of a trigger signal from said congestion check device, said token generation rate device determines a rate with which said priority is generated within said priority device and inputs said rate to said priority device.

12. The marker device according to claim 11, wherein said token generation rate device generates said priority from a reduction factor attributed to said end-to-end connection and from said at least one service quality parameter.

13. The marker device according to claim 10, wherein said priority device generates said priority so as to have one of a predetermined set of priority values.

14. The marker device according to claim 13, wherein said token rate generation device decreases the rate of generating a first type of priority having a first predetermined value of said set, based on said reduction factor.

15. The marker device according to claim 10, wherein said at least one service quality parameter comprises of at least one of an agreed bandwidth value and an agreed burst tolerance value.

16. A terminal coupled to a packet network and adapted to transmit data packets of a data transmission flow pertaining to an end-to-end connection within said packet network to at least one other terminal coupled to said packet network, said terminal comprising a marker device according to claim 10.

17. An access router apparatus of a packet network, said access router apparatus receiving data packets from a terminal coupled to said access router, said data packets pertaining to an end-to-end connection within said packet network between said terminal and another terminal coupled to said packet network, wherein said access router apparatus comprises a marker device according to claim 10.

18. The marker device according to claim 11, wherein said inserting device receives said data transmission flow and extracts, from said data packets of said data transmission flow, data packet parameters to forward to said priority device, which generates said priority from said extracted data packet parameters.

19. The marker device according to claim 11, wherein said token generation rate device generates said priority rate from an increase factor attributed to said end-to-end connection and from said at least one service quality parameter.

20. The marker device according to claim 19, wherein said token generation rate device increases the rate of generating said first type of priority, based on said increase factor.

* * * * *